United States Patent

Werner et al.

[11] Patent Number: 5,536,119
[45] Date of Patent: Jul. 16, 1996

[54] ROUNDED CUTTING INSERT

[75] Inventors: Heinz Werner, Gävle; Åke Almersand, Årsunda, both of Sweden

[73] Assignee: Sandvik AB, Sandviken, Sweden

[21] Appl. No.: 248,712

[22] Filed: May 25, 1994

[30]    Foreign Application Priority Data

May 26, 1993 [SE] Sweden ............................ 9301790

[51] Int. Cl.$^6$ ........................................ B23C 5/24
[52] U.S. Cl. .................. 407/36; 407/42; 407/82; 407/92; 407/113
[58] Field of Search .................. 407/36–39, 42, 407/48, 81–84, 87, 90, 93, 113

[56]             References Cited

U.S. PATENT DOCUMENTS

| 280,148 | 6/1883 | Douglas | 407/90 |
|---|---|---|---|
| 3,545,061 | 12/1970 | Michael | 407/90 |
| 4,527,930 | 7/1985 | Harroun | 407/48 |
| 5,123,787 | 6/1992 | Hunt | 407/39 |

FOREIGN PATENT DOCUMENTS

| 2854299 | 7/1979 | Germany . |
|---|---|---|
| 2950698 | 7/1980 | Germany . |
| 3402547 | 8/1985 | Germany . |
| 904900 | 2/1982 | U.S.S.R. . |
| 2103975 | 3/1983 | United Kingdom . |
| 92/21472 | 12/1992 | WIPO . |

*Primary Examiner*—M. Rachuba
*Assistant Examiner*—Kenneth J. Hansen
*Attorney, Agent, or Firm*—Burns, Doane, Swecker & Mathis

[57]             ABSTRACT

A cutting insert is mounted in a pocket of a holder so that rotation of an adjustment member mounted in the holder produces rotation of the insert about a center axis. The insert includes top and bottom surfaces interconnected by a side surface. The side surface includes a curved portion engaging side support surfaces of the holder, a pair of planar surfaces extending from respective ends of the curved portion, and a portion extending from one of the planar surfaces to define a parallel land. The curved portion engages the adjustment member so that rotation of the latter produces a fine adjustment of the parallel land.

7 Claims, 3 Drawing Sheets

5,536,119

ROUNDED CUTTING INSERT

BACKGROUND OF THE INVENTION

The present invention relates to a cutting insert intended to be carried by a cartridge in a rotatable milling cutter body, whereby a major part of the periphery of the cutting insert is round.

Milling cutter tools are generally known in which insert-carrying cartridges are placed around the peripheral envelope surface of a cutter body. Depending upon how many cutting inserts the cutter body comprises, it is denoted as a coarse, close or extra-close pitch milling cutter. For face- and square shoulder milling in, for instance, the motor industry, a very precise positioning of the cutting edges is required, both in absolute terms and relatively to the other cutting edges in the milling cutter. Thus, the axial height difference between two cutting edges should not exceed a few μm in order to attain the required surface smoothness.

In copending U.S. patent application Ser. No. 08/233,332 filed Apr. 26, 1994 (corresponding to Swedish Application No. 9301399-3) a construction is described for attaining a very accurate axial and radial position of the cutting edges in a milling cutter, which application is hereby incorporated herein by reference. According to that application, a milling cutter primarily for aluminum machining is formed with grooves milled in the envelope surface, in which grooves are mounted insert-carrying cartridges and spacer plates. These cartridges and spacer plates include serrated surfaces for mutually independent fine adjustment axially and radially.

Besides axial and radial adjustment, also the so-called angle of the parallel land has to be finely adjusted because this angle also has a great importance for the achieved surface smoothness. The angle of the parallel land is defined as the angle between the cutting edge of the parallel land and the produced surface on the workpiece. In order to make possible an adjustment of the angle of the parallel land, according to prior art the cutting insert has been mounted in a so-called cradle, which can be turned until the desired angle of the parallel land has been attained (see for instance German Document 31 40 905). However, this construction has the inconvenience that it comprises a number of separate parts and thus is rather complicated. Furthermore, the axial fine adjustment of the cutting insert is rendered difficult, since a further boundary line is created, viz. the line between cradle and cartridge. Moreover, such constructions cause instability because separate parts are mounted upon another in order to make possible a fine adjustment of the cutting inserts, whereby measure tolerances are superposed.

Thus, one object of the present invention is to make possible a quick and accurate fine adjustment of the angle of the parallel land of each cutting insert.

Another object of the present invention is to make possible an adjustment of the angle of the parallel land with as few separate parts as possible.

A further object of the present invention is to permit a movement of the cutting insert in its insert pocket without altering the preset clamping force, which is of utmost importance for a safe and stable positioning of the insert in the insert pocket.

SUMMARY OF THE INVENTION

These and other objects have been achieved by a cutting insert comprising an upper chip surface, a bottom surface disposed opposite the upper chip surface, and side surfaces extending between the upper chip surface and the bottom surface. The side surface includes first, second, third and fourth portions. The first portion is curved with a constant radius of curvature with reference to a center axis of the insert extending perpendicular to the upper chip surface. The first portion extends for at least 180°. The second and third portions extend from respective ends of the first portion and converge toward one another. The fourth portion, which constitutes the parallel land of the insert, is disposed between the second and third portions and is oriented at an obtuse angle with respect to each of the second and third portions.

Preferably, the side surface includes a fifth portion disposed between the fourth portion and the other of the second and third portions. The fifth portion forms an obtuse angle with each of the fourth portion and said other of the second and third portions.

The insert is to be mounted in the pocket of a holder, the holder having a rotary adjustment member engageable with the insert to rotate the insert about the center axis.

BRIEF DESCRIPTION OF THE DRAWINGS

The objects and advantages of the invention will become apparent from the following detailed description of a preferred embodiment thereof in connection with the accompanying drawings in which like numerals designate like elements, and in which.

DETAILED DESCRIPTION OF PREFERRED EMBODIMENTS OF THE INVENTION

Figure 1:
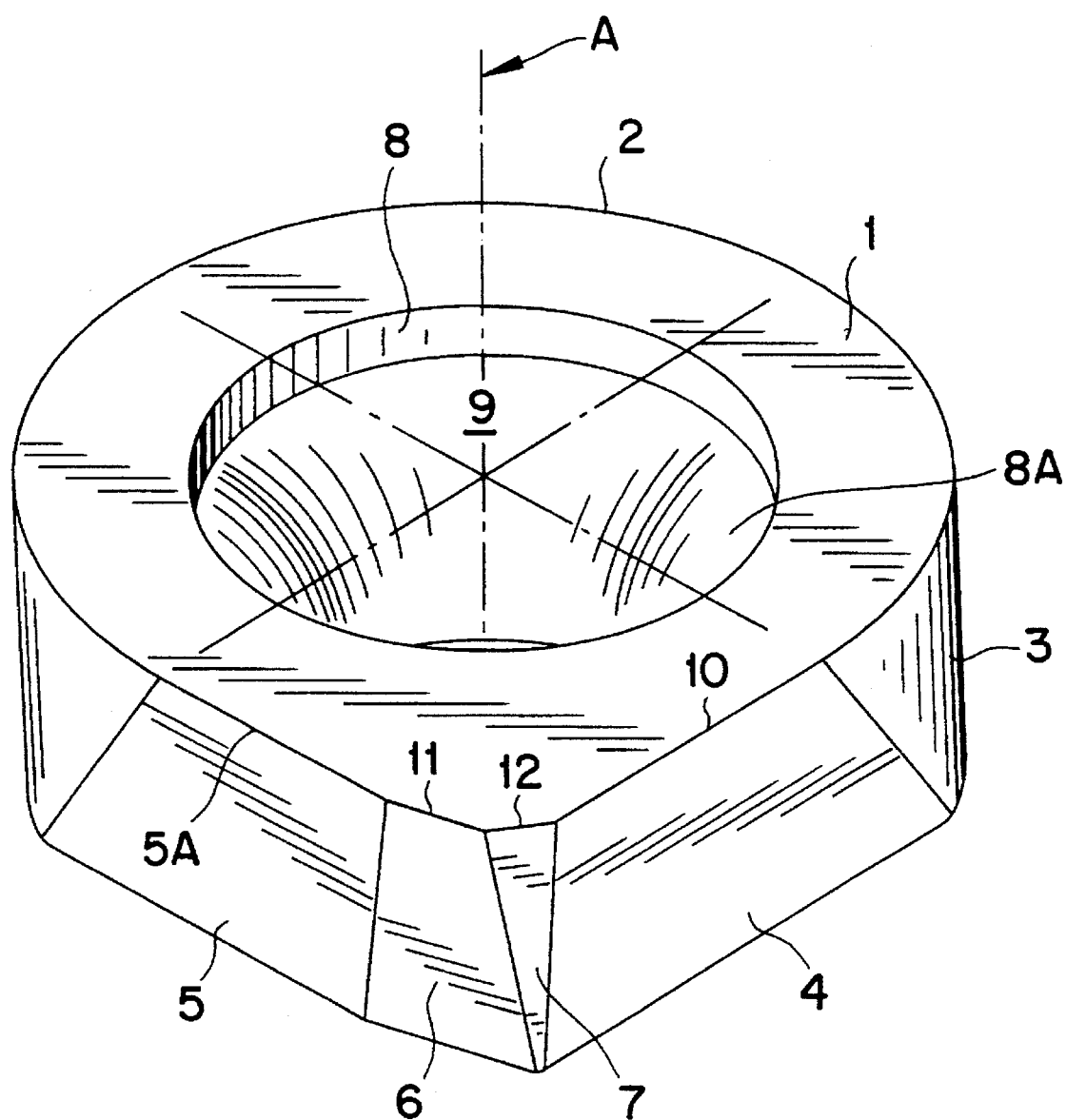
FIG. 1 shows a cutting insert according to the invention in a top perspective view.

FIG. 1 shows in general a cutting insert according to the invention. It can be made of cemented carbide or any other hard material, for instance, different sorts of ceramics. It can also comprise an inlay of a special hard material in the operative cutting region, such as polycrystalline diamond or cubic bore nitride. If the cutting plate is of cemented carbide, it can be non-coated or coated, for instance, with one or several layers of titanium carbide and/or titanium nitride, or with a layer of polycrystalline diamond. Further, a cutting plate of cemented carbide can be either ground or directly pressed into the desired final shape. Its IC-measure (i.e., the size of the inscribed circle) is usually between 10 and 15 mm and its thickness between 3, 5 and 6 mm.

Figure 3:
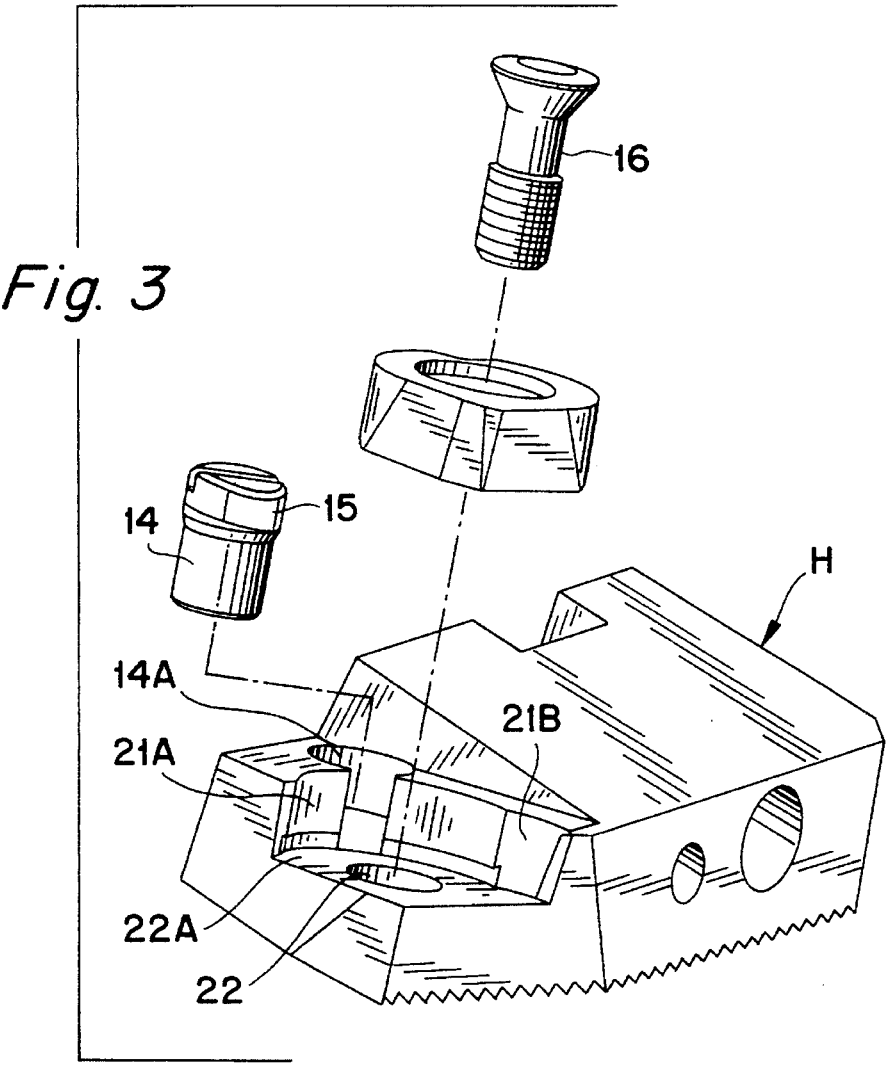
FIG. 3 illustrates the mounting of the cutting insert of FIG. 2 into a cartridge.
Figure 5:
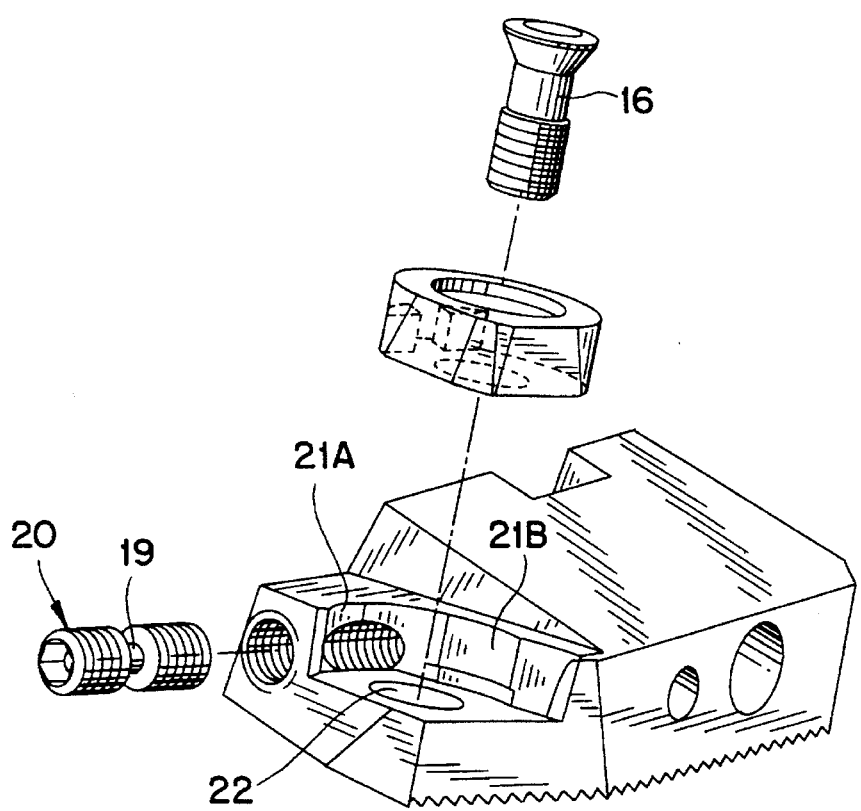
FIG. 5 illustrates the mounting of the cutting insert of FIG. 4 into a cartridge.

The cutting insert comprises an upper chip surface 1 and a bottom surface whose plane is substantially parallel to the chip surface 1. This bottom surface is intended to rest upon a bottom support surface 22A in an insert pocket of a holder H, as illustrated in FIGS. 3 and 5. The insert further includes a side surface 3–7 extending between the upper and bottom surfaces. At least one half (i.e., 180°), and preferably about ¾ of the side surface comprises a substantially constant-radius curved side surface portion 3, which is substantially perpendicular to the upper chip surface 1 and to the bottom surface. That surface portion 3 is of constant radius with reference to a center axis A of the insert extending perpendicular to the top surface 1. The remaining fourth of the insert's side periphery comprises the surfaces 4–7. The surfaces 4 and 5 are oriented substantially perpendicular to each other. Surface 4 is a clearance surface disposed under the main cutting edge 10, whereby the edge angle formed between chip surface 1 and clearance surface 4 suitably is between 70° and 90°, preferably between 75° and 85°. The angle between surface 5 and chip surface 1 can also suitably lie within said ranges.

In the region between surfaces 4 and 5 the cutting insert is formed with the surfaces 6, 7. The surface 6, which constitutes the planar land of the insert, forms a secondary cutting edge 11 with the upper chip surface 1. Suitably, the cutting edge angle of the secondary cutting edge 11 is also within the above-described ranges (70°–90° and 75°–85°). The angle between this secondary cutting edge 11 and the surface produced on the workpiece constitutes the angle of the parallel land 6, whose accurate adjusting is a main purpose of the present invention. The secondary cutting edge 11 is from 20 to 40 percent of the edge 5A defined by the intersection of surfaces 5 and 1. Between the land 6 and the clearance surface 4 is the surface 7 which comprises a reinforcing chamfer 7 which reinforces the cutting corner against the imposed stress. The chamfer 7 forms with the chip surface 1 a minor secondary cutting edge 12. The edge angle of the latter is suitably between 65 and 90°, preferably between 70° and 80°. The angle between surfaces 5 and 6 is suitably between 176° and 179.5°.

A through-hole 8A is provided in the center of the cutting insert for the insertion of a suitable locking screw 16 which is attachable within a threaded hole 22 formed in the bottom surface 22A of the holder pocket. The upper part 8 of the hole is substantially cylindrical, while the remaining part 9 of the hole tapers downwardly in the form of a convexly vaulted surface.

Figure 2:
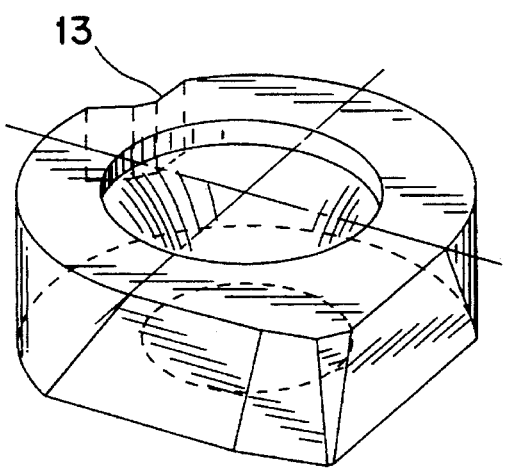
FIG. 2 shows a preferred embodiment of the cutting insert according to the invention in a top perspective view.

By rotating the insert about the axis A, the angle of the parallel land 6 is finely adjusted. Rotation of the insert can be achieved in any suitable way. For example, the cutting insert according to FIG. 2 is the same as in FIG. 1 with the exception of a recess 13 formed in the curved side surface portion 3. This recess 13 does not have to extend the full thickness of the insert, but rather could extend, for instance, between a third and half of the thickness of the cutting insert. An adjustment pin 14 with a radially protruding adjustment nose 15 can be arranged in a hole 14A of the cartridge as shown in FIG. 3. The hole 14A intersects a side support surface 21A of the holder pocket so that the adjustment nose 15 projects into recess 13. Thus, a rotation of the adjustment pin 14 by means of for instance, a screw driver, results in a rotating movement also of the cutting insert (after the locking screw 16 has been loosened somewhat), and thereby also results in an adjustment of the angle of the parallel land 6. After an exact positioning, the screw 16 is tightened, and the adjustment pin 14 is suitably removed, before the milling cutter body is brought into rotation. Alternatively, the adjustment pin 14 can be formed as an integral end part of a driver tool.

It will be appreciated that the surface portion 3 constitutes a first portion of the side surface of the insert; the surface portions 4 and 5 constitute second and third portions; the surface portion 6 constitutes a fourth portion; the surface portion 7 constitutes a fifth portion.

Figure 4:
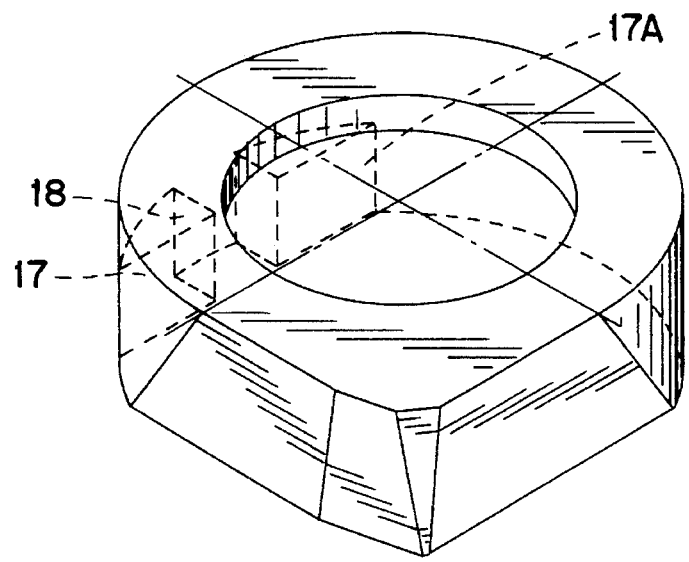
FIG. 4 shows another preferred embodiment of the cutting insert according to the invention in a top perspective view.

In FIGS. 4 and 5 another embodiment is illustrated for rotating the insert and achieving a fine (precision) adjustment of the angle of the parallel land. The cutting insert according to FIG. 4 is the same as in FIG. 1 with the exception of spaced grooves 17, 17A having been made in the curved side surface portion 3 of the cutting insert. A driver segment 18 is formed between the two grooves, which driver segment 18 is intended to intrude into an annular waist part 19 of an adjustment screw 20 which is mounted for rotation in a threaded hole 20A of the holder H. Thus, after having loosened the locking screw 16, the cutting insert can be rotated around its center axis by turning the adjustment screw 20, whereby the angle of the parallel land is finely adjusted. For accuracy, that adjustment can be surveyed optically or by a so-called thousandth gauge.

The cutting insert pocket preferably includes two side support surfaces 21A, 21B, which are provided with fillets down in their lower parts, along the break (joint) line with the bottom support surface 22A. These side support surfaces, which are intended as abutment surfaces against which the cutting insert abuts, have a curvature which substantially coincides with the curvature of the side surface portion 3 of the cutting insert. When the cutting insert abuts against the support surfaces 21A, 21B, the center axis of the insert's hole 8A should be positioned at a somewhat larger distance from the support surfaces than the center axis of the hole 22 of the holder. In accordance with the present invention this distance, i.e., eccentricity, can be held constant by the fact that the cutting insert is provided with the constant-radius side surface portion 3 which rests against the two side support surfaces 21A and 21B. This is important for a satisfactory functioning when the cutting insert is to be pressed into the holder pocket and guarantees a good positioning of the insert and a stable locating thereof. By means of such eccentricity, a stabilizing abutting pressure is obtained between the cutting insert and the side support surfaces when the locking screw 16 is tightened.

By the thus described construction, the adjustment of the angle of the parallel land has been optimized for the attainment of very smooth surfaces on a workpiece made, for example, of aluminum.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A milling cutting insert comprising an upper chip surface, a bottom surface disposed opposite said upper chip surface, and side surface extending between said upper chip surface and said bottom surface, said side surface including:

a curved first portion of constant radius with reference to a center axis of the insert extending perpendicular to said upper chip surface, said first portion extending for about three-fourths of a circumference of said insert, second and third portions extending from respective ends of said first portion and converging toward one another at a substantially ninety degree angle, and a fourth portion disposed between said second and third portions and oriented at an obtuse angle with respect to each of said second and third portions, said second and fourth portions intersecting said upper chip surface to form therewith main and secondary cutting edges, respectively.

2. A cutting insert according to claim 1, wherein said side surface includes a fifth portion disposed between said fourth portion and the other of said second and third portions, said fifth portion forming an obtuse angle with each of said fourth portion and said other of said second and third portions.

3. A cutting insert according to claim 1, wherein said fourth portion extends from an end of said second portion, said fourth portion intersecting said upper chip surface to form an edge whose length is from 20–40 percent of the length of an edge formed by the intersection of said second portion with said upper chip surface.

4. A cutting insert according to claim 1, wherein said second, third and fourth portions are planar.

5. A cutting insert according to claim 1, wherein said first portion includes a recess formed therein.

6. Apparatus comprising a holder and a cutting insert mounted in said holder, said holder forming a pocket having a bottom support surface and a side support surface extending from said bottom support surface, and a rotary adjustment member having a drive part communication with said pocket, said cutting insert comprising an upper chip surface, a bottom surface disposed opposite said upper chip surface, and a side surface extending between said upper chip surface and said bottom surface, said bottom surface supported by said bottom support surface, said side surface including a curved first portion of constant radius with reference to a center axis of said insert extending perpendicular to said upper chip surface, said first portion extending about three-fourths of a circumference of said insert and engaging said side support surface, said first portion including a driven part engaging said drive part so that rotation of said adjustment member produces rotation of said insert about said center axis, said side surface of said insert further including second and third portions extending from respective ends of said first portion and converging toward one another at a substantially ninety degree angle, and a fourth portion disposed between said second and third portions and oriented at an obtuse angle with respect to each of second and third portions, said second and fourth portions intersecting said upper chip surface to form therewith main and secondary cutting edges, respectively.

7. Apparatus according to claim 6, wherein said insert further includes a fifth portion disposed between said fourth portion and another of said second and third portions, said fifth portion forming an obtuse angle with each of said fourth portion and said other of said second and third portions.

* * * * *